(12) United States Patent
Larue et al.

(10) Patent No.: US 7,108,488 B2
(45) Date of Patent: Sep. 19, 2006

(54) TURBOCHARGER WITH HYDRODYNAMIC FOIL BEARINGS

(75) Inventors: Gerald Duane Larue, Torrance, CA (US); Sun Goo Kang, Los Angeles, CA (US); Werner Wick, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/812,281

(22) Filed: Mar. 26, 2004

(65) Prior Publication Data

US 2005/0210875 A1 Sep. 29, 2005

(51) Int. Cl.
*F02B 17/00* (2006.01)
*F02B 33/44* (2006.01)
*F16C 32/06* (2006.01)
*F02B 35/00* (2006.01)
*B61F 17/00* (2006.01)

(52) U.S. Cl. .................. 417/407; 60/605.1; 384/103; 384/105; 384/106

(58) Field of Classification Search .............. 417/407; 384/103–106, 535, 119, 160; 123/572, 559.2; 60/684, 605.1
See application file for complete search history.

(56) References Cited

U.S. PATENT DOCUMENTS

| | | | | |
|---|---|---|---|---|
| 3,375,046 A | * | 3/1968 | Marley | 384/105 |
| 3,740,163 A | * | 6/1973 | Schinnerer et al. | 417/407 |
| 4,167,295 A | * | 9/1979 | Glaser | 384/105 |
| 4,170,389 A | | 10/1979 | Eshel | 384/104 |
| 4,402,618 A | | 9/1983 | Fortmann et al. | 384/107 |
| 4,573,808 A | * | 3/1986 | Katayama | 384/114 |
| 4,608,827 A | * | 9/1986 | Hasegawa et al. | 60/605.1 |
| 4,850,721 A | * | 7/1989 | Malabre et al. | 384/106 |
| 5,014,518 A | * | 5/1991 | Thomson et al. | 60/684 |
| 5,102,305 A | * | 4/1992 | Bescoby et al. | 417/407 |
| 5,131,807 A | | 7/1992 | Fischer et al. | 417/407 |
| 5,140,968 A | * | 8/1992 | Doan | 123/572 |
| 5,427,455 A | * | 6/1995 | Bosley | 384/103 |
| 5,529,464 A | * | 6/1996 | Emerson et al. | 384/106 |
| 5,857,332 A | | 1/1999 | Johnston et al. | 417/407 |
| 5,890,881 A | * | 4/1999 | Adeff | 417/407 |

(Continued)

FOREIGN PATENT DOCUMENTS

GB 2335710 9/1999

(Continued)

OTHER PUBLICATIONS

Copy of International Search Report & Written Opinion for PCT Application No. PCT/2005/010145; Filed Mar. 28, 2005; Date of Completion Jun. 27, 2005; Date of Mailing Sep. 21, 2005.

*Primary Examiner*—Thai-Ba Trieu
(74) *Attorney, Agent, or Firm*—Chris James (57) ABSTRACT

A turbocharger includes a foil bearing assembly mounted in a center housing between a compressor and a turbine of the turbocharger. The bearing assembly forms a unit installable into the center housing from one end thereof, and the center housing is a one-piece construction. The bearing assembly includes a foil thrust bearing assembly disposed between two foil journal bearings. The journals foils are mounted in annular bearing carriers fixedly mounted in the center housing. A radially inner portion of a thrust disk of the thrust bearing assembly is captured between a shaft and a shaft sleeve of the turbocharger. The center housing defines cooling air passages for supplying cooling air to the foil bearings, and optionally includes a water jacket for circulating engine coolant through the center housing.

10 Claims, 4 Drawing Sheets

U.S. PATENT DOCUMENTS

| | | | |
|---|---|---|---|
| 5,911,510 A * | 6/1999 | Saville | 384/106 |
| 6,036,435 A | 3/2000 | Oklejas | 415/106 |
| 6,261,002 B1 | 7/2001 | Ermilov et al. | 384/105 |
| 6,263,672 B1 * | 7/2001 | Roby et al. | 60/602 |
| 6,439,209 B1 * | 8/2002 | Wenger et al. | 123/559.2 |
| 6,655,910 B1 | 12/2003 | Fonda-Bonardi | 415/106 |
| 6,668,553 B1 * | 12/2003 | Ghizawi | 417/407 |
| 6,964,522 B1 * | 11/2005 | Kang et al. | 384/106 |
| 2002/0039461 A1 | 4/2002 | Obara et al. | 384/535 |
| 2002/0097928 A1 | 7/2002 | Swinton et al. | 384/103 |
| 2003/0169951 A1 | 9/2003 | Nishijima et al. | 384/103 |
| 2004/0066991 A1 * | 4/2004 | Agrawal | 384/105 |
| 2005/0013515 A1 * | 1/2005 | Nakata | 384/103 |

FOREIGN PATENT DOCUMENTS

| | | | |
|---|---|---|---|
| JP | 07208189 A * | 8/1995 | |
| WO | WO 02/04827 A1 | 1/2002 | |

* cited by examiner

Fig. 3.

TURBOCHARGER WITH HYDRODYNAMIC FOIL BEARINGS

BACKGROUND OF THE INVENTION

The invention relates to turbochargers used for boosting the performance of engines such as diesel and gasoline automotive engines and the like.

Turbochargers for diesel and gasoline automotive engines have conventionally employed oil-lubricated bearings. The turbocharger is connected to the engine oil system and engine oil is supplied into the bearing housing of the turbocharger to lubricate the bearings, and the oil is then discharged from the bearing housing and returned to the engine oil system.

Oil-lubricated turbochargers are prone to oil seal failures. If the oil seal on the turbine side of the turbocharger fails and allows oil to leak into the turbine, the oil ends up being discharged into the engine exhaust system, which can increase undesirable emissions from the engine.

The durability of an oil-lubricated turbocharger is highly dependent on the engine lubrication system. The now common use of low-viscosity oils and high engine oil temperatures to reduce friction adversely affects the stability and durability of the turbocharger bearing system, as well as the effectiveness of the oil seals. On the other hand, operation under very cold conditions can lead to a delay of the oil pressure reaching the turbocharger and can also result in turbo bearing durability problems.

Additionally, oil-lubricated turbochargers are restricted to being used in a particular horizontal orientation, since they depend on gravity for draining the oil from the bearings. As a result, the engine or vehicle designer does not have much freedom with respect to placement of the turbocharger.

These and other drawbacks of oil-lubricated turbochargers have led industry to seek to develop a practical turbocharger employing hydrodynamic air foil bearings. Foil bearings have been used in air cycle machines (turbomachines used in a cooling cycle where air is the working fluid) for the aerospace industry since approximately 1970. Such air cycle machines are used, for example, for supplying cooling air for electronics in military aircraft, and for supplying air for cabin climate control systems in commercial aircraft. It is relatively easy to adequately cool foil bearings in an air cycle machine because the machine operates at a relatively low temperature, typically a few hundred degrees Fahrenheit. However, prior to the present invention, it is believed no production turbochargers incorporating foil bearings have been developed, at least in part because difficulties have been encountered in adequately cooling the foil bearings. Without adequate cooling, foil bearings tend to have short useful lives.

Thus, while the benefits of incorporating foil air bearings into a turbocharger are well understood, significant technical challenges have to be overcome to develop a practical design. These challenges include developing an adequate bearing housing thermal design and cooling system to avoid overheating the foil coatings, providing adequate seals to prevent bearing contamination by engine oil and combustion products, and developing a high stiffness shaft design to avoid shaft instability at high speeds.

The present invention addresses the above needs and achieves other advantages.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figures 1, 2:
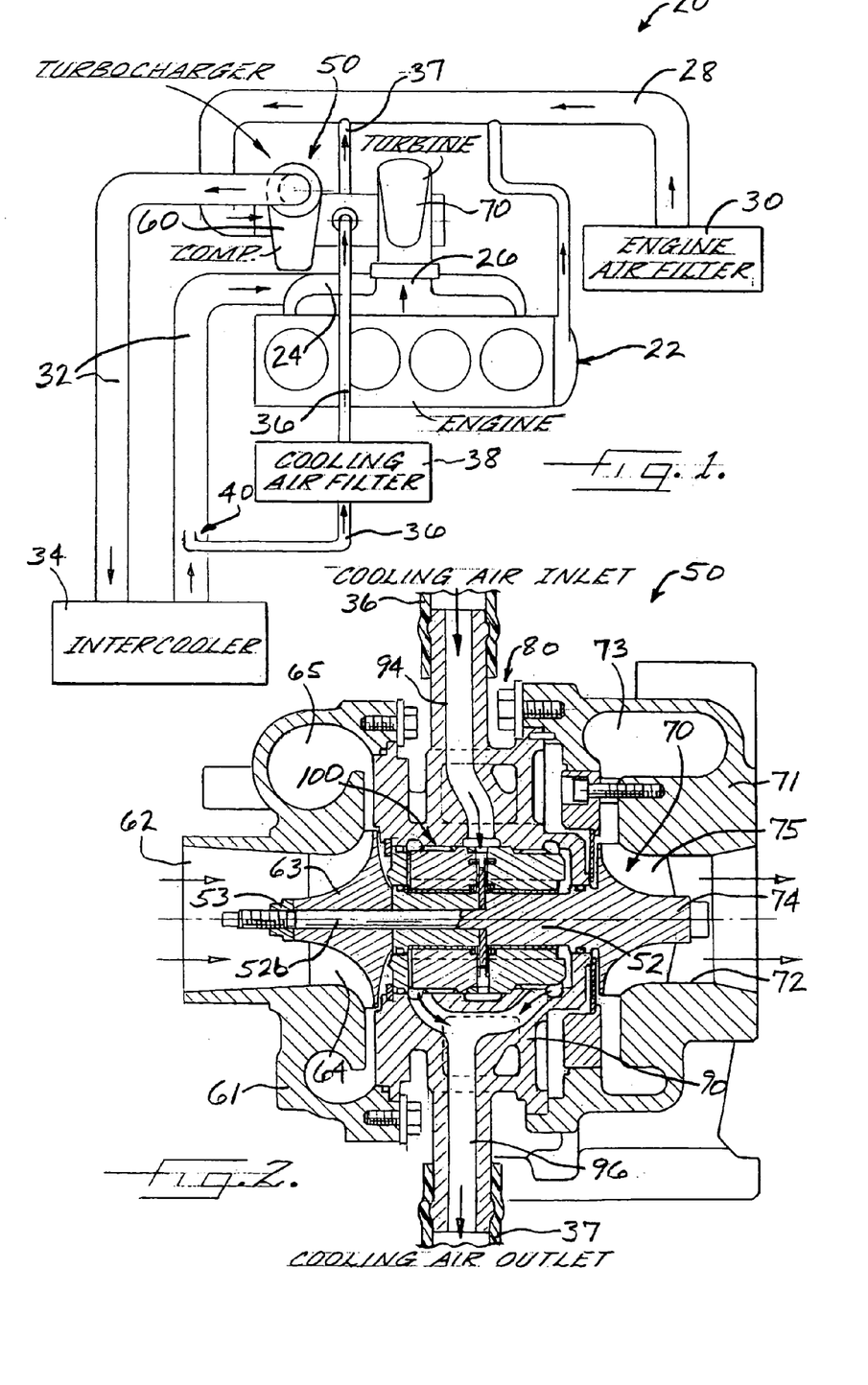
FIG. 1 is a schematic depiction of a turbocharged engine system in accordance with one embodiment of the invention.
FIG. 2 is an axial cross-sectional view of a turbocharger in accordance with an embodiment of the invention.

FIG. 1 schematically depicts an engine system 20 in accordance with an embodiment of the present invention, employing an "oil-less" turbocharger having foil bearings. The system 20 includes an engine 22, shown as a reciprocating internal-combustion engine. The engine can be of various types, including diesel engines or gasoline engines, having various numbers and arrangements of cylinders. The engine includes an air intake 24 through which air is supplied to the engine for mixing with fuel to be burned in the cylinders of the engine, and an exhaust 26 through which combustion gases produced in the cylinders are exhausted.

The system 20 includes a turbocharger 50 comprising a compressor 60 and a turbine 70. The turbocharger boosts engine power by compressing the air that is supplied to the air intake 24 of the engine. Thus, air is drawn into the compressor 60 through a suitable inlet duct 28; the air can be filtered by an air filter 30. The compressor 60 compresses the air and supplies it, via an intake duct system 32, to the engine air intake 24. As known in the art, an intercooler or heat exchanger 34 can be provided in the air intake system for cooling the compressed air before it is fed into the engine. As further described below, foil air bearings of the turbocharger 50 are cooled by cooling air drawn from the intake system downstream of the compressor 60. Preferably, the cooling air is drawn from a point downstream of the intercooler 34, via a cooling air line 36. An air filter 38 can be provided in the cooling air line 34 for filtering out oil vapor that may be contained in the air. Oil vapor in the cooling air also can be reduced or minimized by using a reverse pitot 40 (i.e., a pitot tube that faces away from the oncoming air stream) for extracting the cooling air from the intake duct 32. When the air filter 38 is included, the reverse pitot 40 may not be necessary and can be replaced by a forward pitot or by a flush static tap. On the other hand, when the air filter is omitted, it may be preferable to employ the reverse pitot 40.

FIG. 2 shows a turbocharger 50 in accordance with one embodiment of the invention, which can be used in an engine system such as shown in FIG. 1. The major components or modules of the turbocharger include the compressor 60, the turbine 70, and a center housing and bearing assembly 80. The compressor 60 comprises a compressor housing 61 that defines an axially extending air inlet 62 through which air to be compressed is received into the compressor assembly. Mounted within the compressor housing is a compressor wheel 63 that is rotatable about a central longitudinal axis of the turbocharger. The compressor wheel 63 is mounted on one end of a rotatable shaft 52 that extends longitudinally through the center housing and bearing assembly 80 and connects to the turbine wheel as described below. The shaft 52 comprises a two-part assembly having stepped shaft part and a shaft sleeve. The stepped shaft part defines a larger-diameter portion 52a adjacent to and joined with the turbine wheel and a smaller-diameter portion 52b joined to the larger-diameter portion and extending through a central bore in the compressor wheel 63; an end of the smaller-diameter portion is threaded and a nut 53 is threaded onto the end to secure the compressor wheel. The shaft sleeve 52c is press-fit about the smaller-diameter portion 52b and has an outer diameter equal to that of the larger-diameter portion 52a.

The compressor wheel supports a plurality of compressor blades 64. The housing 61 and the wheel 63 define a flow path therebetween, and the blades 64 occupy the flow path. The flow path is oriented generally axially at an upstream side of the compressor wheel, and then turns radially outwardly so that it extends generally radially outwardly at a downstream side of the wheel adjacent the trailing edges of the blades 64. Air is ingested through the inlet 62 into the row of blades 64 and is compressed as it travels along the flow path through the compressor; the compressed air is discharged radially outwardly into a generally annular volute 65 defined by the compressor housing. From the volute 65, the compressed air is supplied via a discharge pipe (not shown) to the engine air intake duct 32 (FIG. 1). The compressor illustrated in FIG. 1 is generally referred to as a radial compressor, or a centrifugal compressor; however, the invention is not limited to any particular type of compressor, and other types may be used, such as axial-flow compressors.

The turbine 70 includes a turbine housing 71 that defines a central cylindrical bore 72 therethrough. The turbine housing also defines a generally annular volute or chamber 73 that surrounds the central bore 72 and opens into the bore at a radially inner side of the chamber. Mounted on the opposite end of the shaft 52 from the compressor wheel 63 is a turbine wheel 74 that supports a plurality of turbine blades 75. In a typical installation of the turbocharger, hot exhaust gas from the engine is supplied via a suitable exhaust duct system 26 (FIG. 1) into the chamber 73. The exhaust gas flows generally radially inwardly (although it can also have an axial component) from the chamber into the row of turbine blades 75, which are appropriately shaped so that the turbine wheel 74 is rotatably driven by the exhaust gas. The exhaust gas is expanded to a lower pressure as it passes through the turbine, and is then discharged from the turbine housing 71. Mechanical power generated by the turbine is used to drive the compressor via the shaft.

With reference particularly to FIGS. 2–5, the center housing and bearing assembly 80 includes a center housing 90 having a central bore therethrough, coaxially arranged with respect to the rotational axis of the compressor wheel. A foil air bearing assembly 100 is mounted within the bore of the center housing. The foil air bearing assembly 100 defines a central bore therethrough, and the shaft 52 extends through the bore in the bearing. During operation, there is a radial clearance between the shaft and the bearing bore so that the shaft can rotate with respect to the bearing; air is supplied into the bearing assembly via a supply passage 94 defined in the center housing. The air that has lubricated and cooled the bearing assembly is discharged from the center housing via a discharge passage 96. It should be noted that at rest and at low speeds, the foil is preloaded against the shaft and there is no clearance. Once the shaft is rotating fast enough to generate sufficient pressure, the foil is pushed away from the shaft and the clearance results.

With reference primarily to FIGS. 3 and 6–9, the foil air bearing assembly 100 includes a first foil journal bearing 120, a second foil journal bearing 140, and a foil thrust bearing assembly 160. In the illustrated embodiment, the thrust bearing assembly 160 is disposed between the journal bearings 120, 140. This is referred to herein as a "center-mounted thrust bearing" configuration. Each of the journal bearings is retained in an annular bearing carrier removably installed in the bore 92 of the center housing, and has one or more foils disposed along the inner surface of the bearing carrier surrounding the shaft 52. In the description that follows, the term "outboard" is used to refer to the compressor side of the turbocharger and the term "inboard" is used to refer to the turbine side of the turbocharger. Thus, the first journal bearing 120 may also be referred to as the outboard journal bearing, and the second journal bearing 140 may be referred to as the inboard journal bearing.

Figure 3:
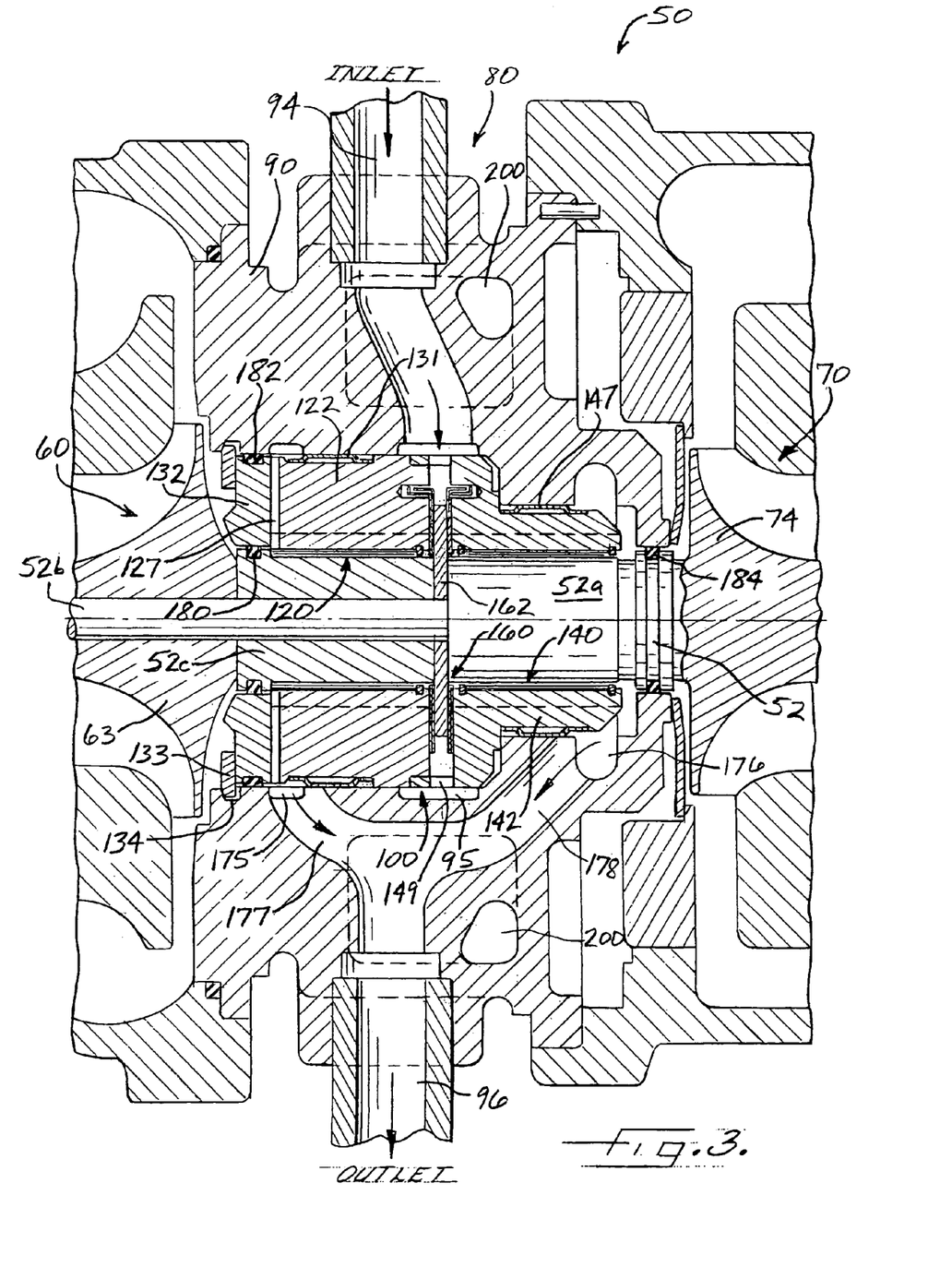
FIG. 3 is an axial cross-sectional view, on an enlarged scale relative to FIG. 2, showing the center housing and bearings of the turbocharger in greater detail.
Figure 4:
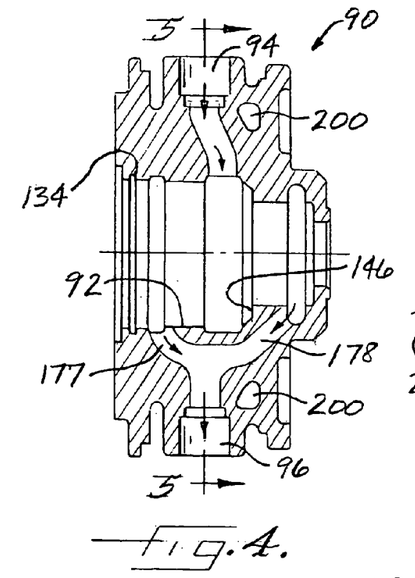
FIG. 4 is an axial cross-sectional view of the center housing.
Figure 6:
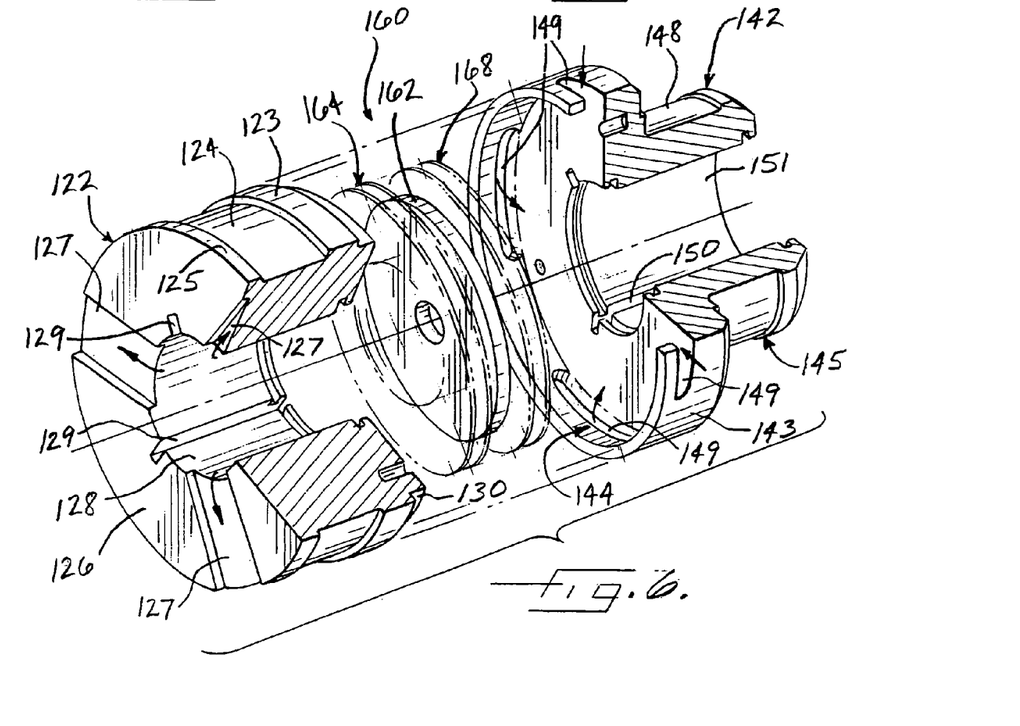
FIG. 6 is an exploded perspective view of a bearing assembly of the turbocharger in accordance with one embodiment of the invention.

The first or outboard journal bearing 120 comprises a first annular bearing carrier 122 that is installed in an outboard portion of the center housing bore 92 adjacent the compressor. The bearing carrier 122 can be made of various materials; heat transfer to the journal bearing can be reduced by making the carrier of a poor thermally conducting material such as stainless steel, ceramic, or the like. The bearing carrier 122 has an outer surface that is generally cylindrical and is made up of an annular maximum-diameter portion 123, an annular recess 124, an annular surface 125 at the outboard end of the bearing carrier, and an annular surface 130 at the inboard end of the bearing carrier. The recess 124 in the outer surface is located between the maximum-diameter portion 123 and the annular surface 125. The maximum-diameter portion 123 has a diameter less than that of the outboard portion of the center housing bore 92 in which the bearing carrier 122 is installed. To locate the bearing carrier 122 radially within the bore 92, an undulating ring 131 is mounted about the bearing carrier within the recess 124 in its outer surface. The ring 131 undulates in the circumferential direction; its undulations project radially out from the outer surface of the bearing carrier and abut the inner surface of the bore 92 in the center housing. The ring 131 advantageously can comprise a tolerance ring. The ring is formed of a metal. To minimize heat transfer from the center housing to the bearing carrier 122, the ring 131 advantageously comprises a material having a relatively low thermal conductivity, such as stainless steel or the like. In addition to its heat transfer-reducing function, the ring 131 may also help attenuate vibration and/or noise from shaft unbalance.

The outboard end face 126 of the bearing carrier 122 has three radially extending recesses 127 formed therein and circumferentially spaced about the axis of the carrier. The end face 126 abuts a support ring 132 removably installed in the outboard end of the center housing bore 92. The support ring 132 is prevented from moving axially in the outboard direction (i.e., toward the compressor) by a beveled retaining ring 133 that is adjacent the outboard face of the support ring 132 and fits into an annular groove 134 in the inner surface of the center housing bore 92.

The inner surface 128 of the outboard bearing carrier 122 is cylindrical and includes three circumferentially spaced slots 129 (which are circumferentially staggered with respect to the recesses 127 in the outboard face of the carrier). The slots 129 (only two of which are visible in FIG. 6) extend axially along the full length of the inner surface 128. As further described below, one of the slots 129 provides an anti-rotation feature for a foil assembly installed along the inner surface 128 of the bearing carrier; the other two slots 129 allow cooling air to pass therethrough behind the foil assembly.

Figure 8:
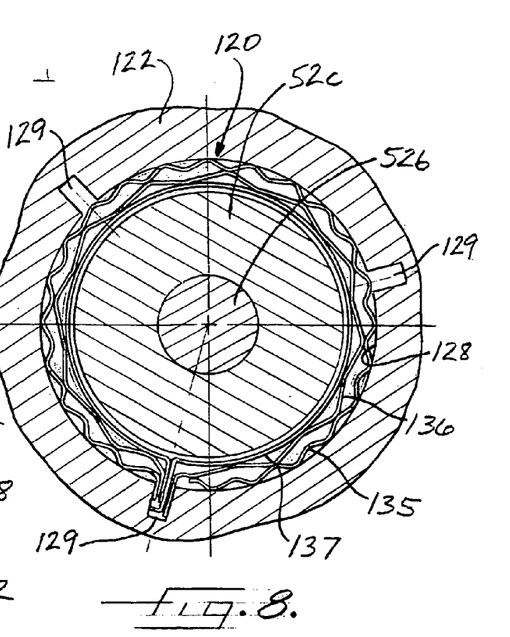
FIG. 8 is a cross-sectional view on line 8—8 in FIG. 7, showing details of one of the journal bearings in accordance with one embodiment of the invention.

As noted, a foil assembly is mounted within the bearing carrier 122. With particular reference to FIG. 8, the foil assembly includes a pair of generally tubular outer and inner spring elements 135 and 136; the inner spring element 136 is disposed coaxially within the outer spring element 135. Each of the spring elements undulates in the circumferential direction so as to define undulations that extend axially. The radially outer surfaces of the undulations of the outer spring element 135 abut the inner surface 128 of the bearing carrier 122. The radially outer surfaces of the undulations of the inner spring element 136 abut the inner surface of the outer spring element 135. Each of the spring elements is split along an axial split line and the resulting edges of each spring element are bent to extend radially outwardly and are inserted into one of the slots 129 in the inner surface of the bearing carrier. The foil assembly also includes a generally tubular foil 137 coaxially disposed within the inner spring element 136 adjacent the outer surface of the shaft sleeve 52c. At zero and low speeds, the foil 137 is against the shaft sleeve 52c; when the rotational speed becomes great enough to develop sufficient pressure, the foil is pushed away from the shaft sleeve so that a clearance exists between them. As with the spring elements, the foil 137 is split along an axial split line and the resulting edges are bend to extend radially outwardly and are inserted into the slot 129. The engagement of the ends of the foil and spring elements in the slot 129 prevents the foil assembly from rotating when the shaft rotates. It is also possible to employ foil assemblies comprising a plurality (e.g., three) of arcuate spring element segments and foil segments that collectively form a full circumferential foil assembly, wherein the edges of the spring elements and foil segments fit into the slots 129 to prevent rotation. The foil or foil segments generally comprise a metal substrate having a friction-reducing coating on the radially inner surface that faces the shaft. Various coatings can be employed, including but not limited to polymer-based coatings, metal oxide-based coatings (e.g., NASA PS 304), etc.

The second or inboard journal bearing 140 has a construction generally similar to that of the outboard journal bearing described above. The bearing includes a generally annular bearing carrier 142 installed in an inboard portion of the center housing bore 92 adjacent the turbine wheel 74. The bearing carrier 142 can be made of a poor thermally conducting material such as stainless steel, ceramic, or the like. The bearing carrier 142 at its outboard end (i.e., the end adjacent the outboard bearing carrier 122) has a tubular portion 143 provided by virtue of an axially extending recess 144 machined into the outboard face of the bearing carrier. The inner diameter of the tubular portion 143 and the outer diameter of the surface 130 of the inboard end of the outboard bearing carrier 122 are such that the end of the carrier 122 is received into the tubular portion 143 with a close fit (and, if desired, a slight interference fit, although an interference fit is not essential) so that the two parts are coaxially aligned. The end of the tubular portion 143 abuts a step in the outer surface of the outboard bearing carrier 122; the recess 144 in the inboard bearing carrier is axially longer than the end portion of the carrier 122 received into the recess, such that a space is defined between the carriers for containing a thrust bearing assembly, described below. The outer surface of the inboard bearing carrier 142 is stepped such that there is a larger-diameter portion that includes the tubular portion 143 at the outboard end, and a smaller-diameter portion 145 at the inboard end adjacent the turbine. The larger-diameter portion abuts an outboard-facing surface 146 (FIG. 4) of the center housing to prevent the bearing carrier 142 from moving axially toward the turbine.

The outer diameter of the larger-diameter portion of the carrier 142 has a diameter less than that of the inboard portion of the center housing bore 92 in which the bearing carrier 142 is installed. To locate the bearing carrier 142 radially within the bore 92, an undulating ring 147 is mounted about the bearing carrier within a recess 148 in the outer surface of the smaller-diameter portion of the carrier 142. The ring 147 undulates in the circumferential direction; its undulations project radially out from the outer surface of the bearing carrier and abut the inner surface of the bore 92 in the center housing. The ring 147 advantageously can comprise a tolerance ring. The ring is formed of a metal. To minimize heat transfer from the center housing to the bearing carrier 142, the ring 147 advantageously comprises a material having a relatively low thermal conductivity, such as stainless steel or the like. In addition to its heat transfer-reducing function, the ring 147 may also help attenuate vibration and/or noise from shaft unbalance.

The tubular portion 143 of the bearing carrier 142 has four circumferentially spaced, elongate slots 149 extending radially through the tubular portion into the space that exists between the two bearing carriers 122, 142, for passing cooling air into such space to cool the thrust bearing assembly disposed therein. Further description of the thrust bearing assembly and the cooling system for the thrust and journal bearings is provided below.

A foil assembly substantially similar to that described above in connection with the outboard journal bearing 120 is installed within the inboard bearing carrier 142. Accordingly, the description of this foil assembly is not repeated here for the sake of brevity, except to note that the spring elements and foil or foil segments engage one of three axial slots 150 (only two of the slots visible in FIG. 6) in the inner surface 151 of the bearing carrier 142.

Figure 7:
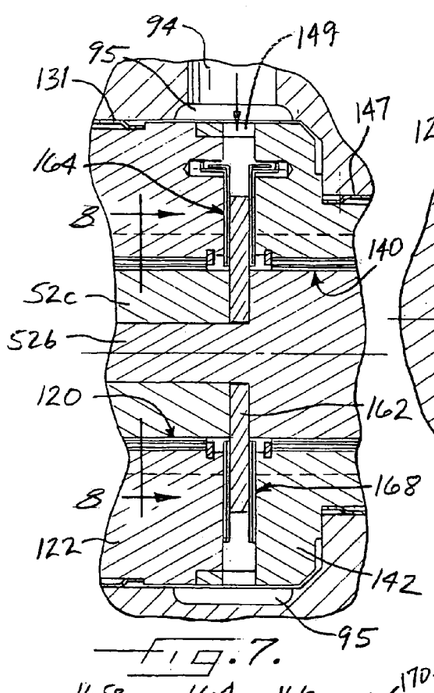
FIG. 7 is an axial cross-sectional view showing a thrust bearing assembly in accordance with an embodiment of the invention.
Figure 9:
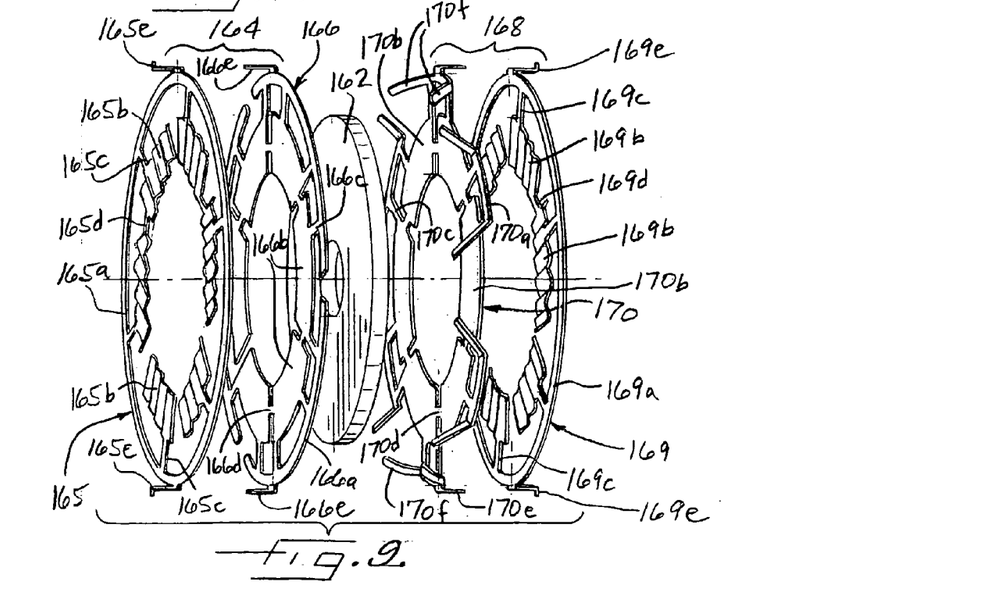
FIG. 9 is an exploded perspective view of a thrust bearing assembly in accordance with an embodiment of the invention.

The thrust bearing assembly 160 of the turbocharger comprises a thrust disk 162 disposed between a first or outboard thrust bearing assembly 164 and a second or inboard thrust bearing assembly 168. In FIG. 6, the two thrust bearing assemblies 164, 168 are shown only diagrammatically. FIG. 9 shows the entire thrust bearing assembly 160 in detailed exploded view, and FIG. 7 shows the thrust bearing assembly installed in the turbocharger. As seen in FIG. 7, a radially inner portion of the thrust disk 162 is captured between the shaft sleeve 52c and the larger-diameter portion 52a of the stepped shaft part; thus, the thrust disk moves axially with the shaft in response to pressure loads in the turbocharger. Depending on the operating condition, the shaft and thrust disk may move either outboard or inboard.

The outboard thrust bearing assembly 164 comprises a generally annular or ring-shaped spring element 165 and a generally annular or ring-shaped foil 166. The inboard thrust bearing assembly 168 comprises a generally annular or ring-shaped spring element 169 and a generally annular or ring-shaped foil 170. The outboard spring element 165 is disposed against the end face of the outboard bearing carrier 122 and the outboard foil 166 is disposed between that spring element and the thrust disk 162. Similarly, the inboard spring element 169 is disposed against the end face of the inboard bearing carrier 142 and the inboard foil 170 is disposed between that spring element and the thrust disk 162.

Various configurations of spring elements and foils can be used for the thrust bearings 164, 168. In the illustrated embodiment, the spring element 165 comprises an outer ring 165a and a plurality of arcuate or sector-shaped spring segments 165b spaced apart about a circumference at a location radially inward of the outer ring 165a. The spring segments 165b are attached to the outer ring 165a by radial connecting webs 165c. The spring segments 165b are arranged in pairs, with the two segments of each pair being connected by a circumferential connecting web 165d. The spring element 165 also includes at least two diametrically opposite fingers 165e that project axially from the outer ring 165a and engage holes in bearing insert 122 to prevent rotation of the spring element 165 and to angularly locate the spring element. The spring segments 165b have an undulating shape in the circumferential direction.

The inboard spring element 169 has a configuration corresponding to that of the outboard spring element. Thus, the spring element 169 has an outer ring 169a, spring segments 169b, radial connecting webs 169c, circumferential connecting webs 169d, and fingers 169e, which correspond with the like elements of the outboard spring element.

The outboard foil 166 comprises an outer ring 166a and a plurality of arcuate or sector-shaped foil segments 166b spaced apart about a circumference at a location radially inward of the outer ring 166a. The outer ring 166a is discontinuous, comprising a plurality (e.g., three, as shown) of arcuate sections spaced about its circumference. The foil segments 166b are attached to the outer ring 166a by radial connecting webs 166c. The foil segments 166b are all connected by circumferential connecting webs 166d. The foil 166 also includes at least two diametrically opposite fingers 166e that project axially from the outer ring 166a and engage the holes in the bearing insert 122 to angularly locate and prevent rotation of the foil 166. The foil segments 166b are structured and arranged to align with the spring segments 165b of the spring element, such that each foil segment is backed up by a spring segment. The outer ring 166a of the foil also aligns with the outer ring 165a of the spring element.

The inboard foil 170 comprises an outer ring 170a and a plurality of arcuate or sector-shaped foil segments 170b spaced apart about a circumference at a location radially inward of the outer ring 170a. The outer ring 170a is discontinuous, comprising a plurality (e.g., six, as shown) of arcuate sections spaced about its circumference. The foil segments 170b are attached to the outer ring 170a by radial connecting webs 170c. The foil segments 170b are all connected by circumferential connecting webs 170d. The foil 170 also includes at least two diametrically opposite fingers 170e that project axially from the outer ring 170a and engage holes in the bearing insert 142 to angularly locate and prevent rotation of the foil 170. The foil segments 170b are structured and arranged to align with the spring segments 169b of the spring element, such that each foil segment is backed up by a spring segment. The outer ring 170a of the foil also aligns with the outer ring 169a of the spring element. The outer ring 170a also defines a plurality of spring tabs 170f that project in the circumferential direction and obliquely relative to the plane of the foil 170. Each arcuate section of the outer ring 170a defines two of the spring tabs 170f at its opposite ends, and the two tabs are angled in opposite oblique directions away from each other. The spring tabs 170f are structured and arranged to contact the outer ring 166a of the outboard foil 166; the spring tabs bias the two foils away from the opposite faces of the thrust disk 162 to help prevent contact therebetween when the turbocharger is not rotating or is rotating at a very slow speed.

During assembly of the thrust bearing assembly 160 in the turbocharger, the fingers 165e and 166e of the outboard spring element and foil, which project out of plane toward the outboard bearing carrier 122, are inserted into corresponding slots or holes defined in the adjacent end face of the carrier. This engagement prevents rotation of the spring element and foil, as previously noted. Similarly, the fingers 169e and 170e of the inboard spring element and foil are inserted into slots or holes defined in the adjacent end face of the inboard bearing carrier 142.

One aspect of the present invention relates to the installation of the bearing assembly 100 in the center housing 90. In particular, for ease of assembly, the bearing assembly 100 advantageously comprises a unit or cartridge comprising the foil thrust bearing assembly 160 retained between the first and second foil journal bearings 120 and 140 by virtue of the connection between the bearing carriers 122 and 142. The bearing cartridge 100 and the center housing bore 92 are configured such that the bearing cartridge is insertable as a unit into the bore from the end of the center housing adjacent the compressor 60.

Cooling of the foils of the journal and thrust bearings is a particular aspect of the present invention. The cooling system is now described with reference primarily to FIGS. 1–3. As previously noted, the center housing 90 defines a cooling air supply passage 94 that extends into the center housing bore 92. Cooling air extracted from the engine intake duct 32 is supplied through a line 36 that connects to the supply passage 94. The passage 94 opens into an annular space 95 that surrounds the bearing assembly 100; the annular space 95 is provided by virtue of an annular groove or channel formed in the inner surface of the bore 92 in the center housing. The annular space 95 is aligned with the slots 149 in the inboard bearing carrier 142. Thus, cooling air is supplied through the slots 149 into the thrust bearing 160. The cooling air supplied through the slots 149 proceeds radially inwardly and flows through the air space between each foil 166, 170 and the thrust disk 162 and also flows through the spaces defined between the foils and their respective bearing carriers 122, 142. After flowing radially inwardly past the thrust bearings, the cooling air flows on each side of the thrust disk 162 are turned 90° to flow through the respective journal bearings 120, 140. In this regard, and with reference to FIG. 8, it will be noted that the foil assembly defines a plurality of axially extending cooling passages by virtue of the undulating shapes of the spring elements 135, 136.

The cooling air that cools the outboard journal bearing 120 then is turned radially outward and flows through the recesses 127 in the face of the bearing carrier 120 into an annular space 175 that surrounds the outboard end of the bearing carrier 120. The annular space 175 is provided by virtue of a circumferential groove or channel formed in the inner surface of the center housing bore 92 at that location.

Similarly, the cooling air that cools the inboard journal bearing 140 is turned radially outward and flows into an annular space 176 that surrounds the inboard end of the bearing carrier 142. The annular space 176 is provided by virtue of a circumferential groove or channel formed in the inner surface of the center housing bore 92 at that location.

The annular space 175 at the outboard side of the center housing connects to a passage 177 that leads into the cooling air discharge passage 96. Likewise, the annular space 176 at the inboard side connects to a passage 178 that leads into the discharge passage 96. Accordingly, the cooling air that cools the thrust and journal bearings is discharged through the passage 96. The passage 96 connects to a line 37 that feeds the air back into the inlet duct 28 such that the cooling air is returned to the compressor 60.

A portion of the cooling air supplied into the annular space 95 also flows axially between the outer surface of the bearing carrier 122 and the inner surface of the center housing bore. This is possible because, as previously noted, the maximum outer diameter of the bearing carrier is slightly less than the inner diameter of the center housing bore, and hence a small radial space exists therebetween. Additionally, although the undulating ring 131 mounted about the bearing carrier abuts the inner surface of the bore, there are axial spaces between the ring and the bearing carrier by virtue of the undulations of the ring. Thus, some cooling air flows between the ring 131 and the carrier 122 into the annular space 175. This cooling air assists in reducing heat transfer from the center housing to the bearing carrier 122. (It should be noted that the inboard bearing carrier 142 abuts the center housing 90 on surface 146, which effectively seals off the incoming air and prevents it passing through the inboard undulating ring 147 to the annular space 176.) Additionally, there is limited surface area contact between the rings 131, 147 and the center housing and bearing carriers, which reduces heat transfer therebetween. It is also advantageous to make the rings out of a material having poor thermal conductivity such as stainless steel or the like. Furthermore, the bearing carriers 122, 142 advantageously are also made of a material having poor thermal conductivity, such as stainless steel, ceramic, or the like. These various measures help keep the journal bearings cooler.

Figure 5:
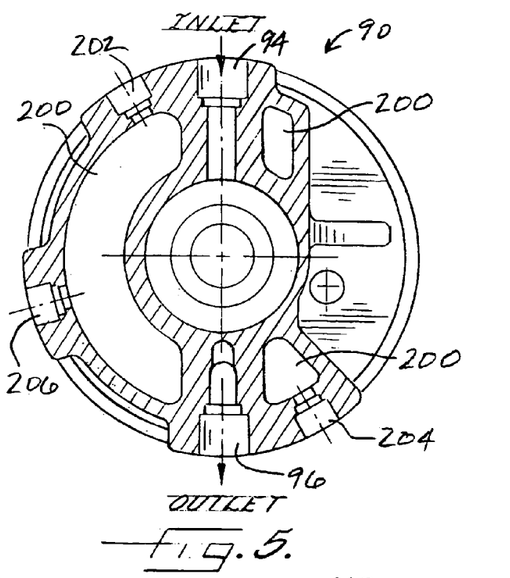
FIG. 5 is a cross-sectional view on line 5—5 in FIG. 4.

In some applications, such as diesel engines, which tend to operate at relatively low peak cycle temperatures, adequate cooling of the foil bearings of the turbocharger may be achievable solely with the air cooling system described above. However, in other applications, such as gasoline engines that tend to run hotter, additional cooling measures may be needed, particularly if the low-friction coatings on the foils have a relatively low maximum allowable temperature (as, for example, some of the polymer type coatings have). Toward this end, the center housing 90 of the turbocharger 50 illustrated in the drawings includes a water jacket 200 comprising at least one cooling water passage that extends circumferentially about the bearing assembly 100. Ports 202 and 204 extend from the outer surface of the center housing into the water jacket 200 for supplying cooling water into and discharging the cooling water from the water jacket. The ports are connected by suitable pipes or hoses (not shown) to the engine's coolant system. With reference to FIG. 5, a third port 206 is shown, but this port is used only during the process of casting the center housing, for passing a mold core support through the mold to support the mold core member. After the center housing is cast, the port 206 is plugged with a blind fitting (not shown).

Another aspect of the invention relates to the sealing arrangements for sealing the bearings. With reference to FIG. 3, at the compressor end of the bearing assembly 100, a piston ring or seal ring 180 is retained in a groove in the outer surface of the shaft sleeve 52c and abuts the radially inner surface of the support ring 132, with a radial compressive loading therebetween, to seal the interface between the shaft and support ring. The seal ring 180 comprises a metal, such as cast iron, stainless steel, or the like, and is a substantially 360-degree circular ring except for a narrow split that allows the ring to be deformed to install it in the groove in the shaft sleeve. Additionally, a resilient O-ring 182 is retained in a groove in the outer surface of the support ring 132 and is radially compressed between the support ring and the inner surface of the center housing bore 92 so as to seal the interface therebetween. The O-ring 182 comprises a resiliently elastic rubber or rubber-like material (e.g., silicone, fluoroelastomer such as VITON® available from DuPont Dow Elastomers L.L.C, etc.

At the turbine end of the bearing assembly 100, there is a single seal comprising a piston or seal ring 184 retained in a groove in the outer surface of the shaft portion 52a. The seal ring 184 is generally of the same type as the seal ring 180, previously described. The seal ring 184 abuts the inner surface of the center housing bore 92, with a radial compressive loading therebetween, to seal the interface between the shaft and center housing.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A hydrodynamic foil bearing assembly installable as a unit into a turbocharger, and comprising:
   a foil thrust bearing assembly comprising an annular thrust disk and a pair of annular foil thrust bearings respectively disposed adjacent opposite faces of the thrust disk; and
   a foil journal bearing assembly comprising a pair of annular journal bearing carriers mounting a journal foil assembly along an inner surface of each annular bearing carrier, the annular bearing carriers respectively disposed on opposite sides of the foil thrust bearing assembly with the annular bearing carriers being connected to each other so as to capture the foil thrust bearing assembly therebetween, each annular bearing carrier having an outer diameter greater than an outer diameter of the thrust bearing assembly such that the thrust bearing assembly does not project radially outward beyond the outer diameters of the annular bearing carriers.

2. The hydrodynamic foil bearing assembly of claim 1, the thrust disk having a portion extending radially inwardly beyond the journal foil assemblies for connection to a shaft of a turbocharger.

3. The hydrodynamic foil bearing assembly of claim 1, wherein each annular bearing carrier has an undulating ring mounted about an outer surface of the annular bearing carrier, each undulating ring defining a plurality of circumferentially spaced undulations that project radially outwardly of the annular bearing carrier for contacting an inner surface of a housing in which the bearing assembly is mounted.

4. A hydrodynamic foil bearing assembly installable as a unit into a turbocharger, and comprising:
   a foil thrust bearing assembly comprising an annular thrust disk and a pair of annular foil thrust bearings respectively disposed adjacent opposite faces of the thrust disk; and
   a foil journal bearing assembly comprising a pair of annular journal bearing carriers mounting a journal foil assembly along an inner surface of each annular bearing carrier, the annular bearing carriers respectively disposed on opposite sides of the foil thrust bearing assembly with the annular bearing carriers being connected to each other so as to capture the foil thrust bearing assembly therebetween, the thrust disk having a portion extending radially inwardly beyond the journal foil assemblies for connection to a shaft of a turbocharger, wherein one of the annular bearing carriers is piloted into the other to locate the annular bearing carriers coaxial with each other.

5. A turbocharger comprising:
   a compressor comprising a compressor housing and a compressor wheel mounted in the compressor housing;
   a turbine comprising a turbine housing and a turbine wheel mounted in the turbine housing;
   a shaft connecting the compressor wheel to the turbine wheel;
   a center housing disposed between and mounted to the compressor and turbine housings, the center housing defining a bore that receives the shaft therethrough;
   a hydrodynamic foil bearing assembly mounted in the bore of the center housing rotatably supporting the shaft;
   wherein the center housing defines a cooling air supply passage leading into the bore for supplying cooling air to the foil bearing assembly, and cooling air discharge passages arranged to receive said cooling air after said cooling air has cooled the foil bearing assembly;
   a cooling air supply line coupled to the cooling air supply passage of the center housing; and
   a reverse pitot tube connected to the cooling air supply line for extracting cooling air from an engine air intake and delivering the cooling air into the cooling air supply line.

6. The turbocharger of claim 5, further comprising a filter arranged in the cooling air supply line for removing oil vapor from the cooling air before the cooling air is supplied to cool the foil bearing assembly.

7. A turbocharger comprising:
   a compressor comprising a compressor housing and a compressor wheel mounted in the compressor housing;
   a turbine comprising a turbine housing and a turbine wheel mounted in the turbine housing;
   a shaft connecting the compressor wheel to the turbine wheel;
   a one-piece center housing disposed between and mounted to the compressor and turbine housings, the center housing defining a bore that receives the shaft therethrough;
   a hydrodynamic foil bearing assembly mounted in the bore of the center housing rotatably supporting the shaft, and comprising a foil thrust bearing assembly, a first foil journal bearing located between the compressor wheel and the foil thrust bearing assembly, and a second foil journal bearing located between the foil thrust bearing assembly and the turbine wheel;
   wherein the center housing defines a cooling air supply passage leading into the bore adjacent the thrust bearing assembly for supplying cooling air to the foil thrust bearing assembly, the journal bearings define cooling passages arranged to receive said cooling air after said cooling air has cooled the foil thrust bearing assembly, and the center housing defines cooling air discharge passages arranged to receive said cooling air after said cooling air has cooled the foil journal bearings; and
   a first metal seal ring disposed about an outer surface of the shaft adjacent the compressor wheel and a second metal seal ring disposed about an outer surface of the shaft adjacent the turbine wheel, the seal rings being radially compressed between the shaft and stationary surfaces of the turbocharger for sealing the bearing assembly, and a stationary annular support ring fixedly mounted in the center housing surrounding the shaft adjacent the first foil journal bearing, the first seal ring being compressed between the shaft and an inner surface of the support ring.

8. The turbocharger of claim 7, wherein an interface between the support ring and an inner surface of the bore in the center housing is sealed by a resiliently elastic O-ring radially compressed between an outer surface of the support ring and said inner surface of the bore.

9. The turbocharger of claim 7, wherein the second seal ring is compressed between the outer surface of the shaft and an inner surface of the bore in the center housing.

10. A turbocharger comprising:
    a compressor comprising a compressor housing and a compressor wheel mounted in the compressor housing;
    a turbine comprising a turbine housing and a turbine wheel mounted in the turbine housing;
    a shaft connecting the compressor wheel to the turbine wheel;
    a one-piece center housing disposed between and mounted to the compressor and turbine housings, the center housing defining a bore that receives the shaft therethrough;
    a hydrodynamic foil bearing cartridge mounted in the bore of the center housing rotatably supporting the shaft, the bearing cartridge comprising a foil thrust bearing assembly retained between first and second foil journal bearings, the bearing cartridge and center housing being configured such that the bearing cartridge is insertable as a unit into the bore of the center housing from an end of the center housing adjacent the compressor, wherein the first foil journal bearing comprises a first annular bearing carrier formed separately from and fixedly mounted in the center housing, and the second foil journal bearing comprises a second annular bearing carrier formed separately from the center housing and first annular bearing carrier and fixedly mounted in the center housing, each annular bearing carrier mounting a foil along an inner surface of the annular bearing carrier, wherein the foil thrust bearing assembly comprises an annular thrust disk and a pair of annular foil thrust bearings respectively disposed adjacent opposite faces of the thrust disk, the annular bearing carriers disposed on opposite sides of the foil thrust bearing assembly with the annular bearing carriers being connected to each other so as to capture the foil thrust bearing assembly therebetween, and wherein one of the annular bearing carriers is piloted into the other to locate the annular bearing carriers coaxial with each other.

* * * * *